US012307997B2

(12) United States Patent
Liu et al.

(10) Patent No.: US 12,307,997 B2
(45) Date of Patent: May 20, 2025

(54) DISPLAY DEVICE, DISPLAY METHOD, AND TERMINAL

(71) Applicants: Beijing BOE Display Technology Co., Ltd., Beijing (CN); BOE Technology Group Co., Ltd., Beijing (CN)

(72) Inventors: Yujie Liu, Beijing (CN); Feng Long, Beijing (CN); Meng Shi, Beijing (CN); Guangquan Wang, Beijing (CN); Xiuyun Chen, Beijing (CN); Jing Zhao, Beijing (CN); Tianyang Han, Beijing (CN)

(73) Assignees: BEIJING BOE DISPLAY TECHNOLOGY CO. , LTD., Beijing (CN); BOE TECHNOLOGY GROUP CO. , LTD., Beijing (CN)

( * ) Notice: Subject to any disclaimer, the term of this patent is extended or adjusted under 35 U.S.C. 154(b) by 0 days.

(21) Appl. No.: 18/272,808

(22) PCT Filed: Aug. 11, 2022

(86) PCT No.: PCT/CN2022/111813
§ 371 (c)(1),
(2) Date: Jul. 18, 2023

(87) PCT Pub. No.: WO2024/031544
PCT Pub. Date: Feb. 15, 2024

(65) Prior Publication Data

US 2024/0395221 A1 Nov. 28, 2024

(51) Int. Cl.
*G09G 3/36* (2006.01)

(52) U.S. Cl.
CPC ..... *G09G 3/3685* (2013.01); *G09G 2310/027* (2013.01); *G09G 2310/08* (2013.01); *G09G 2354/00* (2013.01)

(58) Field of Classification Search
None
See application file for complete search history.

(56) References Cited

U.S. PATENT DOCUMENTS 10,783,843 B2 9/2020 Li et al.
10,936,486 B1 * 3/2021 Swarbrick ........... G06F 12/0284
(Continued)

FOREIGN PATENT DOCUMENTS

CN 104240630 A 12/2014
CN 105528217 A 4/2016
(Continued)

OTHER PUBLICATIONS

Interchip Wikipedia (Year: 2022).*

*Primary Examiner* — Benjamin C Lee
*Assistant Examiner* — Nathan P Brittingham
(74) *Attorney, Agent, or Firm* — XSENSUS LLP

(57) ABSTRACT

Provided is a display device, including: a display panel and a drive mainboard. The drive mainboard includes a first processor and a second processor. The second processor is electrically connected to the first processor and the display panel. The first processor is configured to acquire data of an image changed portion in response to a control instruction and output the data of the image changed portion to the second processor. The control instruction is issued for controlling a partial change of an image displayed on the display panel. The second processor is configured to output N slave input signals to the display panel. The N slave input signals carry the data of the image changed portion, wherein N is a positive integer greater than 1. The display panel is configured to perform partial image refresh based on the data of the image changed portion.

18 Claims, 8 Drawing Sheets

(56) References Cited

U.S. PATENT DOCUMENTS

| | | | | |
|---|---|---|---|---|
| 11,211,024 | B2 | 12/2021 | Chen | |
| 2014/0368478 | A1* | 12/2014 | Chu | G09G 5/395 345/204 |
| 2015/0293785 | A1* | 10/2015 | Murphy | G06F 9/5027 718/102 |
| 2019/0295483 | A1 | 9/2019 | Li et al. | |
| 2019/0303306 | A1* | 10/2019 | Ren | G06F 13/102 |
| 2020/0126504 | A1 | 4/2020 | Chen | |
| 2023/0177151 | A1* | 6/2023 | Khan | G06F 21/566 726/22 |
| 2023/0290315 | A1* | 9/2023 | Zhou | G09G 3/344 |

FOREIGN PATENT DOCUMENTS

| | | | |
|---|---|---|---|
| CN | 107479278 | A | 12/2017 |
| CN | 207302022 | U | 5/2018 |
| CN | 108172193 | A | 6/2018 |
| CN | 109117019 | A | 1/2019 |
| CN | 208588998 | U | 3/2019 |
| CN | 111063285 | A | 4/2020 |
| CN | 112466163 | A | 3/2021 |
| CN | 113160763 | A | 7/2021 |
| CN | 114067758 | A * | 2/2022 |
| CN | 114446252 | A | 5/2022 |
| KR | 10-2016-0005839 | A | 1/2016 |

* cited by examiner

DISPLAY DEVICE, DISPLAY METHOD, AND TERMINAL

CROSS-REFERENCE TO RELATED APPLICATION

The present disclosure is a U.S. national stage of international application No. PCT/CN2022/111813, filed on Aug. 11, 2022, the content of which is herein incorporated by reference in its entirety.

TECHNICAL FIELD

The present disclosure relates to the field of display technologies, and in particular, relates to a display device, a display method, and a terminal.

BACKGROUND OF THE INVENTION

E-books are electronic tablet devices, and E-paper displays (EPD) are typically employed as displays of e-books. The EPD has low power consumption, and thus the e-book has a strong endurance capacity.

SUMMARY OF THE INVENTION

Some embodiments of the present disclosure provide a display device, a display method, and a terminal. The technical solutions are as follows.

According to some embodiments of the present disclosure, a display device is provided. The display device includes a display panel and a drive mainboard, wherein the drive mainboard includes a first processor and a second processor, the second processor being electrically connected to the first processor and the display panel; wherein the first processor is configured to acquire data of an image changed portion in response to a control instruction and output the data of the image changed portion to the second processor, wherein the control instruction is issued for controlling a partial change of an image displayed on the display panel;

the second processor is configured to output N slave input signals to the display panel, wherein the N slave input signals carry the data of the image changed portion, N being a positive integer greater than 1; and the display panel is configured to perform partial image refresh based on the data of the image changed portion.

In some embodiments, the first processor loads an image by a load thread, and acquires the data of the image changed portion by performing image processing, by an algorithm thread, on the image loaded by the load thread.

In some embodiments, the first processor is configured to convert a first grayscale image loaded in response to the control instruction into a second grayscale image, wherein a grayscale number of the first grayscale image is greater than a grayscale number of the second grayscale image, and the grayscale number of the second grayscale image is adaptive to the display panel; determine whether the image displayed on the display panel is partially refreshed by comparing the second grayscale image with an image currently displayed on the display panel, and determine data corresponding to a position where the display panel needs to be refreshed in response to the image on the display panel is partially refreshed; and acquire the data of the image changed portion by adding mode information and address information to the data corresponding to the position where the display panel needs to be refreshed.

In some embodiments, the first processor is configured to convert the first grayscale image in parallel by calling, by an algorithm thread, a plurality of transcode threads, wherein each of the transcode threads processes a plurality of rows of data in the first grayscale image.

In some embodiments, the first processor is further configured to segment each row of data in the data of the image changed portion into N pieces; and acquire N groups of data by organizing a plurality of pieces of data that are arranged in positions of a same order of the data of the image changed portion into one group, wherein the N groups of data respectively correspond to the N slave input signals.

In some embodiments, the first processor is further configured to combine mode information and address information of each piece of data in each group of data and arrange the combined information at a header of the each group of data.

In some embodiments, the first processor is further configured to transmit a data volume of the data of the image changed portion to the second processor; and the second processor is further configured to generate a clock signal based on the data volume, wherein the clock signal is configured to control a time sequence of transmission of the N slave input signals.

In some embodiments, the slave input signal includes image data, address information, and mode information, wherein the address information is an address of a display panel to which the image data is to be written, and the mode information indicates that a refresh mode of the display panel is partial refresh.

In some embodiments, the first processor is a system on chip, and the second processor is a micro controller unit.

In some embodiments, the first processor and the second processor are electrically connected to each other by a universal serial bus interface; and one of the first processor and the second processor is integrated with a universal serial bus physical layer chip, or one of the first processor and the second processor is externally connected to a universal serial bus physical layer chip.

In some embodiments, the display panel is a display panel having a touch function, and the control instruction is a touch instruction generated in response to a touch operation of the display panel.

According to some embodiments of the present disclosure, a display method is provided. The method is applicable to the display device as described above. The method includes:

acquiring data of an image changed portion in response to a control instruction, wherein the control instruction is issued for controlling a partial change of an image displayed on a display panel;

outputting N slave input signals to the display panel, wherein the N slave input signals carry the data of the image changed portion, N being a positive integer greater than 1; and performing partial image refresh based on the data of the image changed portion.

In some embodiments, acquiring the data of the image changed portion in response to the control instruction includes:

loading an image by a load thread, and acquiring the data of the image changed portion by performing image processing, by an algorithm thread, on the image loaded by the load thread.

In some embodiments, acquiring the data of the image changed portion in response to the control instruction includes:

converting a first grayscale image loaded in response to the control instruction into a second grayscale image, wherein a grayscale number of the first grayscale image is greater than a grayscale number of the second grayscale image, and the grayscale number of the second grayscale image is adaptive to the display panel; determining whether the image displayed on the display panel is partially refreshed by comparing the second grayscale image with an image currently displayed on the display panel, and determining data corresponding to a position where the display panel needs to be refreshed in response to the image on the display panel is partially refreshed; and acquiring the data of the image changed portion by adding mode information and address information to the data corresponding to the position where the display panel needs to be refreshed.

In some embodiments, converting the first grayscale image loaded in response to the control instruction into the second grayscale image includes:

converting the first grayscale image in parallel by calling, by an algorithm thread, a plurality of transcode threads, wherein each of the transcode threads processes a plurality of rows of data in the first grayscale image.

In some embodiments, acquiring the data of the image changed portion in response to the control instruction further includes:

segmenting each row of data in the data of the image changed portion into N pieces; and acquiring N groups of data by organizing a plurality of pieces of data that are arranged in positions of a same order in the data of the image changed portion into one group, wherein the N groups of data respectively correspond to the N slave input signals.

In some embodiments, organizing the plurality of pieces of data that are arranged in the positions of the same order in the data of the image changed portion into one group includes:

combining mode information and address information of each piece of data in each group of data and arranging the combined information at a header of the each group of data.

In some embodiments, the method further includes:

generating a clock signal based on a data volume of the data of the image changed portion, wherein the clock signal is configured to control a time sequence of transmission of the N slave input signals.

In some embodiments, the slave input signal includes image data, address information, and mode information, wherein the address information indicates an address of a display panel to which the image data is to be written, and the mode information indicates that a refresh mode of the display panel is partial refresh.

According to some embodiments of the present disclosure, a terminal is provided. The terminal includes a processor and a memory;

wherein the memory is configured to store one or more computer programs; and the processor, when loading and running the one or more computer programs stored in the memory, is caused to perform the display method as described above.

According to some embodiments of the present disclosure, a computer-readable storage medium is provided. The computer-readable storage medium includes one or more computer instructions. The one or more computer instructions, when loaded and executed by a processor, cause the processor to perform the display method as described above.

According to some embodiments of the present disclosure, a computer program product including one or more instructions is provided. The computer program product, when loaded and run on a computer, causes the computer to perform the display method as described above.

BRIEF DESCRIPTION OF DRAWINGS

For clearer descriptions of the technical solutions in the embodiments of the present disclosure, the following briefly introduces the accompanying drawings to be required in the descriptions of the embodiments. Apparently, the accompanying drawings in the following description show merely some embodiments of the present disclosure, and persons of ordinary skills in the art may still derive other drawings from these accompanying drawings without creative efforts.

DETAILED DESCRIPTION

The present disclosure is described in further detail with reference to the accompanying drawings, to clearly present the objects, technical solutions, and advantages of the present disclosure.

In a touch operation on an e-book using a stylus, a drive mainboard of the e-book supplies serial signals to a display integrated circuit in response to a control instruction, and the display integrated circuit converts the serial signals into parallel outputs and supplies the parallel outputs to the display panel.

In some practices, the e-book using the EPD has the following drawbacks: a duration required from occurrence of the touch operation to final refresh of a display image is about 28 ms, which is a long latency. In addition, the e-book includes a plurality of devices therein, such as the drive mainboard, the display integrated circuit, and the display panel, and thus the size of the e-book is large.

Figure 1:
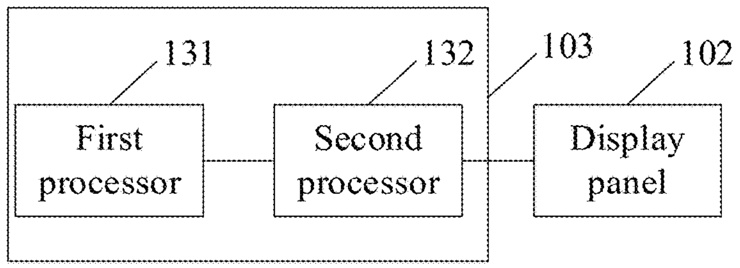
FIG. 1 is a schematic structural diagram of a display device according to some embodiments of the present disclosure.

FIG. 1 is a schematic structural diagram of a display device according to some embodiments of the present disclosure. Referring to FIG. 1, the display device includes a display panel 102 and a drive mainboard 103. The drive mainboard 103 is electrically connected to the display panel 102.

The drive mainboard 103 is configured to transmit data of an image changed portion to the display panel in response to a control instruction. The control instruction is issued for controlling a partial change of an image displayed on the display panel.

The display panel 102 is configured to perform partial image refresh based on the data of the image changed portion.

In some embodiments of the present disclosure, the drive mainboard transmits the data of the image changed portion to the display panel in the case that the control instruction is issued for controlling the partial change of the image displayed on the display panel, and the display panel performs the partial image refresh based on the data of the image changed portion. Because the partial refresh of the display panel takes less time compared with the whole image refresh, the response time is greatly reduced, such that the latency is reduced.

Referring to FIG. 1, the drive mainboard 103 includes a first processor 131 and a second processor 132. The second processor 132 is electrically connected to the first processor 131 and the display panel 102.

The first processor 131 is configured to acquire the data of the image changed portion in response to the control instruction and output the data of the image changed portion to the second processor.

The second processor 132 is configured to output N SI signals to the display panel 102. The N SI signals carry the data of the image changed portion, and N is a positive integer greater than 1.

In some embodiments, two processing units are used. One of the two processing units is responsible for image loading and image processing, which ensures processing speed; and the other implements a serial-to-parallel conversion and transmits images to the display panel by the N parallel SI signals, which ensures data transmission speed.

In addition, the N parallel outputs are implemented by the drive mainboard, which simplifies devices by eliminating the display IC arranged between the drive mainboard and the display panel in some practices.

In some practices, the drive mainboard outputs serial signals, and the display IC converts the serial signals into parallel signals and outputs the parallel signals to the display panel. The present disclosure, however, implements the output of N parallel signals without the need for the display IC by the above structures of the drive mainboard.

In some embodiments, the first processor 131 is a system on chip (SoC), and the second processor 132 is a microcontroller unit (MCU).

In some embodiments, the SoC is responsible for the image loading and the image processing, which ensures the processing speed, and the MCU is configured to simulate transmission of the N SI signals, which ensures the transmission speed of data.

Exemplarily, the first processor 131 includes a central processing unit (CPU) and a graphics processing unit (GPU). The CPU and the GPU are electrically connected to each other.

The CPU transmits coordinate information to the GPU upon receiving signals from a drive integrated circuit, and the GPU generates an image with a corresponding movement track and stores the image in a display cache region.

Exemplarily, the CPU is a processor with a main frequency of 1.1 GHz and above and a dual-core ARM of Cortex-A7 and above, such as a quad-core ARM Cortex-A7 CPU.

Exemplarily, the GPU is a GPU having a QDSP6 v5 core.

Exemplarily, the second processor is a programmable micro-control unit having programmable general-purpose input/output (GPIO) ports of 21 pin and above, and emulates the output of the N parallel SI signals through the GPIO ports, such as emulating the output of the N parallel SI signals through N GPIO ports. For example, the second processor is an STM32H750 MCU, including programmable GPIO ports of 21 pin and above, a universal serial bus (USB) interface, and a decoding module. The main frequency of 480 MHz is used to ensure that the GPIO is capable of achieving regular flips above 4.8 Mhz.

In some embodiments, the first processor 131 and the second processor 132 are implemented by using other chips or processors, which are not limited herein.

It should be worth noting that both the display panel and an electronic paper display of the embodiments of the present disclosure are refreshed row by row, and thus compared with the whole image refresh of the electronic paper display, the partial refresh of the present disclosure takes less time.

Exemplarily, the display device is an electronic book or other type of display device, which is not limited herein.

Exemplarily, the display panel 102 is a memory in pixel (MIP) display panel. The MIP display panel is acquired by arranging a static random access memory (SRAM) arranged within each pixel of a liquid crystal display (LCD) panel, wherein the SRAM is configured to store a data voltage of the pixel. For a single pixel, in the case that a display of a pixel does not need to be changed when an image is updated, an SRAM in that pixel does not change. Only a data voltage, stored in a SRAM within a pixel that needs to be changed, needs to be refreshed. Therefore, the image update latency is smaller during the partial refresh. The power consumption of the MIP display panel is similar to that of the EDP, and the power consumption is low. At the same time, an 8~64 color display is achieved and a refresh rate of a full image is up to 20 Hz. In addition, the MIP display panel uses a glass-based decoding design, which means that a drive circuit is integrated on a screen of the MIP display panel, dispensing a drive integrated circuit (IC).

Figure 2:
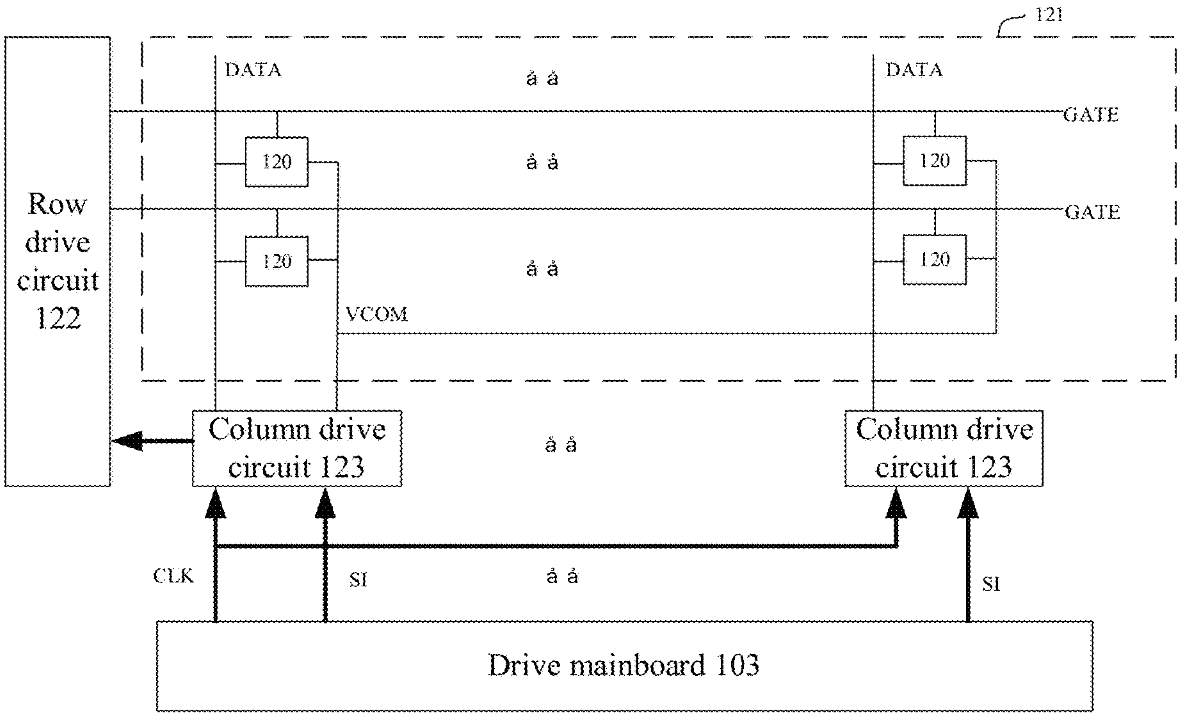
FIG. 2 is a schematic structural diagram of a drive mainboard and a display panel according to some embodiments of the present disclosure.

FIG. 2 is a schematic structural diagram of a drive mainboard and a display panel according to some embodiments of the present disclosure. Referring to FIG. 2, the MIP display panel includes a display region (AA region) 121 and a plurality of subpixels 120 that are arranged within the display region 121. A row drive circuit 122 and a column drive circuit 123 are arranged within a peripheral region outside the display region 121. The row drive circuit 122 is connected to the subpixels 120 by a gate line GATE, and the column drive circuit 123 is connected to the subpixels 120 by a data line DATA and a common line VCOM.

As illustrated in FIG. 2, the drive mainboard 103 transmits a clock signal CLK and a slave input (SI) signal to the column drive circuit 123.

The SI herein is a slave input in a serial peripheral interface (SPI).

The peripheral region of the display panel is further provided with a plurality of serial-to-parallel converters (not illustrated in FIG. 2), which are configured to perform serial-to-parallel conversions on the plurality of SI signals.

Because the SI signal includes image data, address information, and mode information. The address information indicates an address of a display panel to which the image data is to be written, and the mode information indicates that a refresh mode of the display panel is the partial refresh. Thus, the address information and the mode information are decoded upon completion of the serial-to-parallel conversion, such that the row drive circuit is capable of controlling a level of a GATE of a corresponding row based on the address information and the mode information, and controls whether the subpixels of that row refresh the data voltages in the memories.

For example, in the case that the refresh mode is the partial refresh and the addresses are a first row and a second row, the row drive circuit controls only GATEs of the first row and the second row to be in the high level, such that subpixels of that row are capable of refreshing the data voltages in the memories.

In some embodiments, the display panel is a display panel without a touch function.

In some embodiments, the display panel is a display panel with a touch function. For example, in the case that the display device is an e-book, the display panel needs a display function, and a control instruction is a touch instruction generated by a touch operation. The display panel with the touch function is used as an example for descriptions hereinafter. The embodiments described hereinafter are also applicable to the display panel without the touch function, and in this case, the control instruction is not generated by the touch operation but by other operations, which is not limited herein.

Exemplarily, the touch function of the display panel is implemented by a touch layer integrated in the display panel. That is, the display panel is an in-cell touch display panel.

Exemplarily, the touch function of the display panel is implemented by using a touch panel hanging outside the display panel. That is, the display panel is an on-cell touch display panel.

In this way, the touch panel is attached to a side surface of the display panel. For example, a transparent touch panel is attached to the display region of the display panel, or a touch panel is arranged in a non-display region of the display panel.

In some embodiments, the touch panel is implemented by using capacitive touch sensing technology, and the touch panel is a touchpad where a touch operation is performed by a stylus.

A touch event occurs during using the stylus to write on the touch layer. A touch sensor in the touch layer senses the occurrence of the touch event, and transmits touch information such as touch coordinates and touch pressure, which are processed by a touch integrated circuit (touch IC), to the drive mainboard through an inter-integrated circuit (IIC) interface.

Upon receiving the touch information, the drive mainboard determines an operation to be subsequently performed, that is, determines what kind of image to be displayed, generates image data, and then transmits the image to the display panel.

The display panel displays the image upon decoding the display data, which completes the work of display. In this way, the display panel achieves the partial refresh, without the need to perform a full-screen scan and row-by-row activation on the display region like traditional display panels, and thus a time difference from a touch response to a display response is reduced.

Exemplarily, assuming that a duration from occurrence of a touch action to reception of a signal by the touch IC is T1, a duration that the touch IC interacts with the drive mainboard is T2, and a duration from the time when the drive mainboard processes the touch information to the time when the display panel completes the image refresh is T3, the touch latency is the sum of T1, T2, and T3. In conventional implementations, using a refresh rate of 60 Hz as an example, a duration of a frame of image is (1/60) s, which is about 16.7 ms, and a blanking of each frame is about 1 to 2 ms. T3, which is acquired by subtracting the blanking from the duration, is about 15 ms, and the touch latency, which is acquired by T1+T2+T3, is about 28 ms. However, in the case that the MIP display panel, which has the function of the partial refresh, is employed, using performing the partial refresh of 100 rows as an example, a duration for refreshing the 100 rows is about 3 ms, that is, T3≈3 ms, and thus the touch latency, which is acquired by T1+T2+T3, is about 16 ms. In this way, the touch latency is significantly reduced, and thus the user experience is improved.

The process of touch sensing is explained hereinafter combined with a structure of a stylus. The stylus mainly includes a pen point, a pressure sensor, a control module, and a power supply module. The pen point outputs signals, and thus the touch IC is capable of detecting coordinates of a position of the pen point. The pen point is directly in contact with the pressure sensor, and thus a pressure sensed during a writing process of the stylus is transmitted to the pressure sensor. The pressure sensor is capable of sensing changes in writing forces, such that a thickness of handwriting is changed based on the changes in writing forces. The control module performs logical edit and data processing on the signals collected from the pen point. The power supply module uses a direct current converter boost circuit to power the stylus.

The pen point emits a driving signal, and the pen point signal is capable of changing an electric field at a touch point, thereby changing an electrode capacitance at the touch point. The touch IC determines the coordinates of the stylus by detecting the change in the electrode capacitance. The emission signal of the pen point is a sine wave, a triangle wave, or a square wave, using a frequency from tens of KHz to hundreds of KHz. In addition, the stylus acquires a pressure rating by processing pressure data and transmits pressure information to the touch IC by the pen point, and the touch IC then transmits the pressure information to the drive mainboard. In this way, the processing and transmission of the coordinates and the pressure information are achieved.

The touch IC scans coordinates of a position actually touched by charging and discharging the touch sensor, that is, transmits a beacon signal (i.e., a coordinate signal). Upon receiving the beacon signal, the pen point transmits the same beacon signal to achieve synchronization. Upon completion of the synchronization, the stylus transmits key, logo, power, and pressure information to the touch IC by the pen point. This different information is represented by electrical signals of different frequencies. The touch IC detects these electrical signals and transmits these electrical signals to the drive mainboard.

In some embodiments, the touch panel is implemented using other touch sensing technologies, such as electromagnetic touch sensing technology, which is not limited herein.

In some embodiments, the drive mainboard 103 is configured to successively perform the image loading and image processing in response to the control instruction output by the touch panel, and output data acquired from the image processing to the display panel 102.

The image loading herein refers to, on the basis of an image currently displayed, generating, in response to the control instruction, a plurality of images generated in response to the touch operation process. The images herein are images with higher grayscales generated for a conventional display panel, such as an image with 256 grayscales.

Upon completion of the loading of the images, the drive mainboard 103 further processes the images, such as transcoding the images and reducing grayscales of the images, such that the images are adaptive to the display of the display panel. In addition, it is also possible to determine whether the refresh mode is static hold (no refresh), partial refresh, or global refresh by comparing the loaded image with the currently displayed image, such that only a portion of the image is refreshed in the case that the refresh mode is the partial refresh, and thus the touch display latency is reduced.

Figure 3:
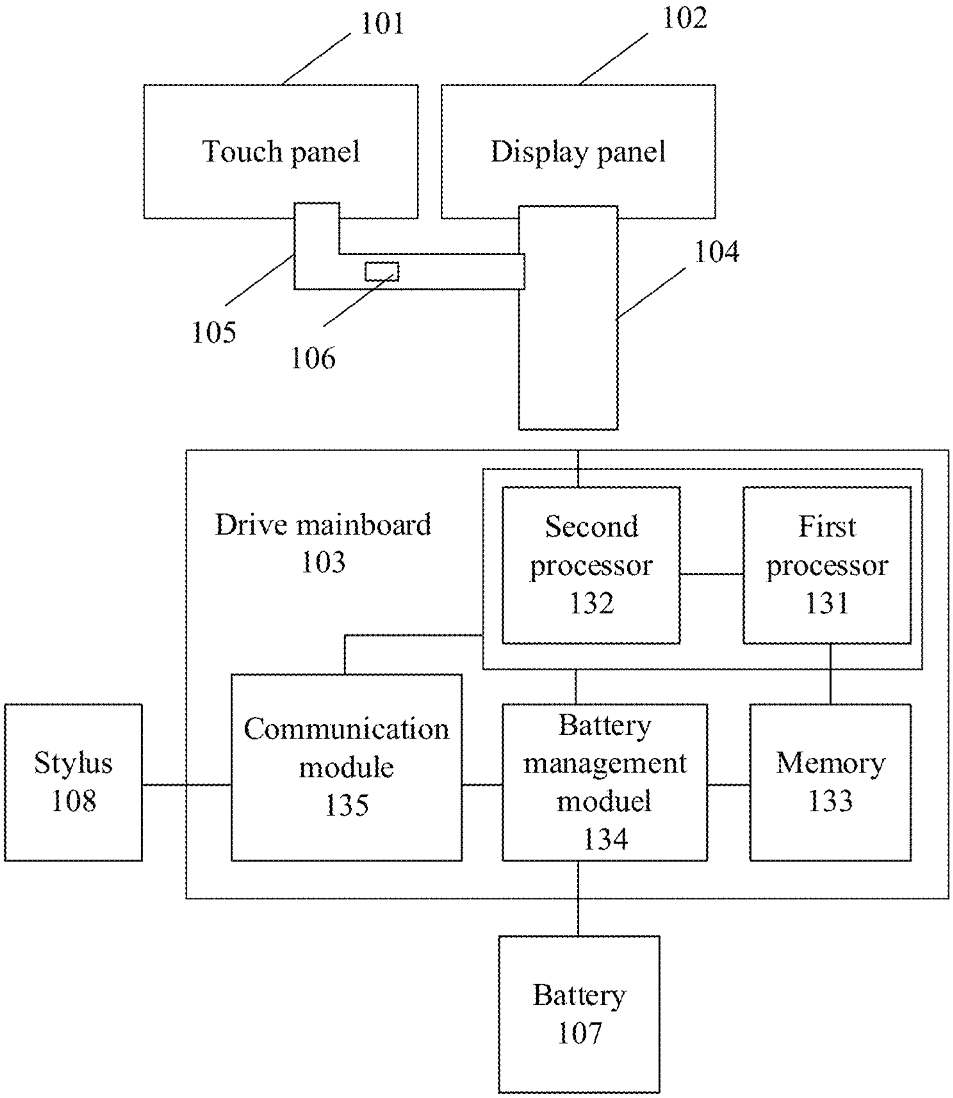
FIG. 3 is a schematic structural diagram of a display device according to some embodiments of the present disclosure.

FIG. 3 is a schematic structural diagram of a display device according to some embodiments of the present disclosure. Referring to FIG. 3, the drive mainboard 103 is connected to the display panel 102 by a flexible printed circuit board (FPC) 104 and is connected to a touch panel 101 by a touch FPC 105. The touch FPC 105 is electrically connected to the touch IC 106.

In some embodiments, the first processor 131 and the second processor 132 are electrically connected to each other by a USB interface.

One of the first processor and the second processor is integrated with a USB physical layer (PHY) chip, or one of the first processor and the second processor is externally connected to a USB PHY chip.

In some embodiments, a USB high-speed (HS) interface is implemented by the built-in or external USB PHY chip, and high-speed transmission is achieved by the USB HS interface, and thus the latency is reduced.

Exemplarily, the USB interface between the first processor 131 and the second processor 132 is a USB interface supporting a transmission speed of 85 Mbps and above, such as a USB 2.0 port that supports the transmission speed of 12 Mbps in a full-speed mode and the transmission speed of which is up to 480 Mbps in a high-speed mode.

In some embodiments, the first processor 131 and the second processor 132 are electrically connected to each other by other interfaces, which is not limited herein.

Referring to FIG. 3, the drive mainboard 103 further includes a memory 133, a battery management module 134, and a communication module 135.

The memory 133 is connected to the first processor 131 and the battery management module 134. The memory is configured to store instructions and data generated by the drive mainboard.

Exemplarily, the memory 133 is an embedded multimedia card (EMMC) memory of 4 GB and above or a low power double data rate (LPDDR) SDRAM of 4 GB and above, such as an 8 GB EMMC or an 8 GB LPDDR.

The power management module 134 is configured to be electrically connected to a battery 107, and the power management module 134 is also electrically connected to the first processor 131, the second processor 132, and the communication module 135.

Exemplarily, the power management module 134 includes a power management chip and its peripheral circuits. The power management chip is a chip that outputs voltages of 1.8V/2.85V/2.95V/3.8V, which provides the required power to various devices of the drive mainboard and manages the charging and discharging of the battery.

In some embodiments, the power management module 134 is further connected to a USB interface, which is used for input of an external power supply and interaction with external signals. The USB interface is a USB interface that supports a transmission speed of more than 12 Mbps.

The communication module 135 is electrically connected to the first processor 131 and is communicated with a stylus 108.

Exemplarily, the communication module 135 includes at least one of a Bluetooth module and a wireless fidelity (Wi-Fi) module. The communication module communicates with the stylus 108 via Bluetooth or WIFI and transmits received signals to the first processor 131.

In some embodiments, the first processor 131 performs the image loading by a load thread, and acquires the data of the image changed portion by performing the image processing, by an algorithm thread, on the image loaded by the load thread.

In some embodiments, the image loading and the image processing are performed separately by two threads, which avoids lag that tends to occur when one thread is used to perform the loading and processing, and thus the latency is further reduced.

Figure 4:
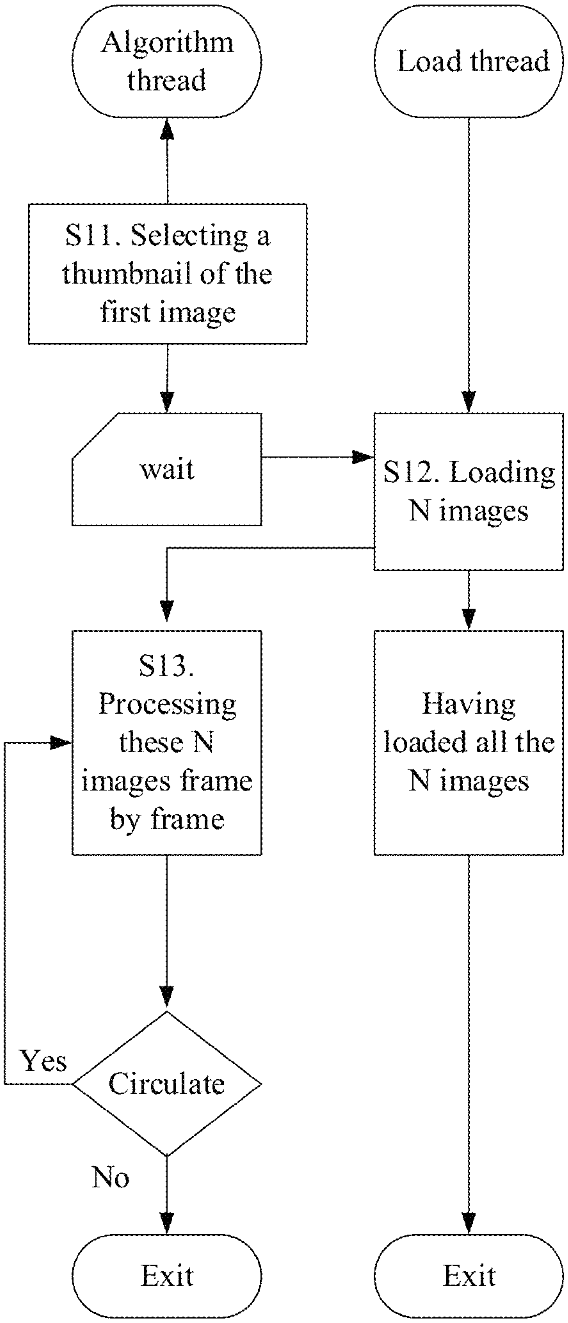
FIG. 4 is a flowchart of image loading and processing according to some embodiments of the present disclosure.

FIG. 4 is a flowchart of image loading and processing according to some embodiments of the present disclosure. Referring to FIG. 4, a process of the image loading and processing includes the following steps. In S11, the algorithm thread selects a thumbnail of the first image from the cache and then enters a waiting state. In S12, the load thread loads N images from the storage and transmits the N images to the algorithm thread. In S13, the algorithm thread processes these N images frame by frame, and determines, upon completion of processing each of the images, whether to process the next one, until the N images have been processed and exits the process. At the same time, the load thread repeats step S12, until all images that have been loaded from the cache exits the process.

With the above method, it is possible to avoid lag caused by too many images being loaded at one time, and thus the latency is reduced.

Exemplarily, in step S12, the number of images loaded each time is 15.

In some embodiments, the first processor 131 performs the image loading and processing by one thread.

In some embodiments, the first processor 131 is configured to convert a first grayscale image loaded in response to the control instruction into a second grayscale image. The grayscale number of the first grayscale image is greater than the grayscale number of the second grayscale image. The grayscale number of the second grayscale image is adaptive to the display panel. Comparing the second grayscale image with an image currently displayed on the display panel, whether the image displayed on the display panel is partially refreshed is determined. In the case that the refresh mode of the display panel is the partial refresh, data corresponding to a position where the display panel needs to be refreshed is determined. The data of the image changed portion is acquired by adding the mode information and the address information to the data corresponding to the position where the display panel needs to be refreshed.

In some embodiments, in one aspect, the first grayscale image is converted into the second grayscale image by transcoding, which is more suitable for the display of the display panel; in another aspect, the data corresponding to the position that needs to be refreshed is determined by comparison, and the mode information and address information are added, such that the display panel is capable of implementing the partial refresh based on the data output from the first processor, and thus the touch latency is small.

Exemplarily, the grayscale number of the first grayscale image is 256 (corresponding to a grayscale range of 0 to 255) and the grayscale number of the second grayscale image is 8 (corresponding to a grayscale range of 0 to 7). The larger the grayscale number, the larger the grayscale range. By converting the image of 256 grayscales to the image of 8 grayscales that is more suitable for the display panel, compared with an image of 3 grayscales displayed on the electronic paper display panel, the grayscales are richer.

In some embodiments, the first processor 131 is configured to convert the first grayscale image in parallel by calling a plurality of transcode threads by an algorithm thread. Each of the transcode threads processes a plurality of rows of data in the first grayscale image.

In some embodiments, compared with using a single thread for processing, using the plurality of threads to process the first grayscale image in parallel increases transcoding efficiency and reduces the latency.

Exemplarily, the first grayscale image includes 1024 rows of pixel points. That is, the first grayscale image corresponds to 1024 rows of data. The first processor 131 transcodes the 1024 rows of data by 8 transcode threads, and each of the transcode threads processes 128 rows of data.

A process of the image conversion is described hereinafter using a scenario where a color depth of an image generated by the first processor 131 is 8 bits (i.e., 256 grayscales) and a color depth that is normally supported by the MIP display panel is 1 bit (i.e., 8 grayscales) as an example. It should be noted that the number of grayscales of the above image is only an example and is not intended to construe any limitation to the present disclosure.

The first processor 131 converts the loaded image (R/G/B 8:8:8, with grayscale numbers from 0 to 255) to an image required by the MIP (R/G/B 1:1:1, with grayscale numbers of 0 and 1). In some embodiments, the principle of conversion is as the following. Grayscale values x of R, G, and B are determined; in the case that $x>127$, $x=1$ is output; and in the case that $x<127$, $x=0$ is output. The process is described hereinafter in conjunction with the accompanying drawings.

Figure 5:
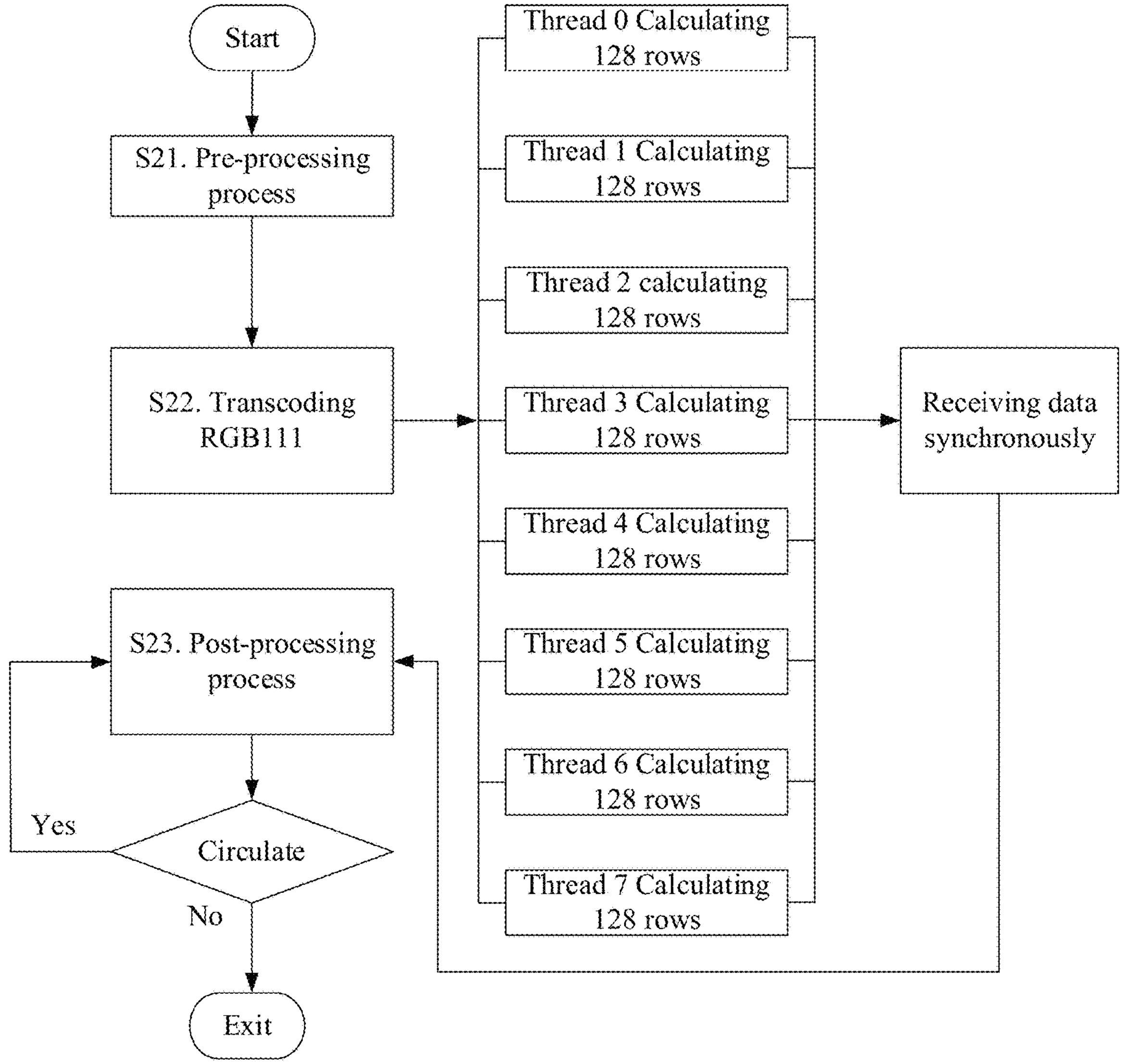
FIG. 5 is a flowchart of an image conversion according to some embodiments of the present disclosure.

FIG. 5 is a flowchart of an image conversion according to some embodiments of the present disclosure. Referring to FIG. 5, the process of the image conversion includes the following steps. In S21, a pre-processing process is performed. The algorithm thread in the first processor 131 acquires image information of RGB888. In S22, RGB111 is transcoded. In order to improve the transcoding efficiency and reduce the algorithm latency, the 1024 rows of data of the image are segmented into 8 groups of data. Eight transcode threads synchronously perform the grayscale conversion on the 8 groups of data, and each of the eight transcode threads processes 128 rows of data. In S23, a post-processing process is performed. Data output from the eight transcode threads is collected and integrated into data of a single frame of RGB111.

The converted data is changed from representing the grayscale of one sub-pixel by per 8 bits to storing the grayscale of one sub-pixel in 1 bit, and the number of colors is changed from 16.7 M colors to 8 colors.

Figure 9:
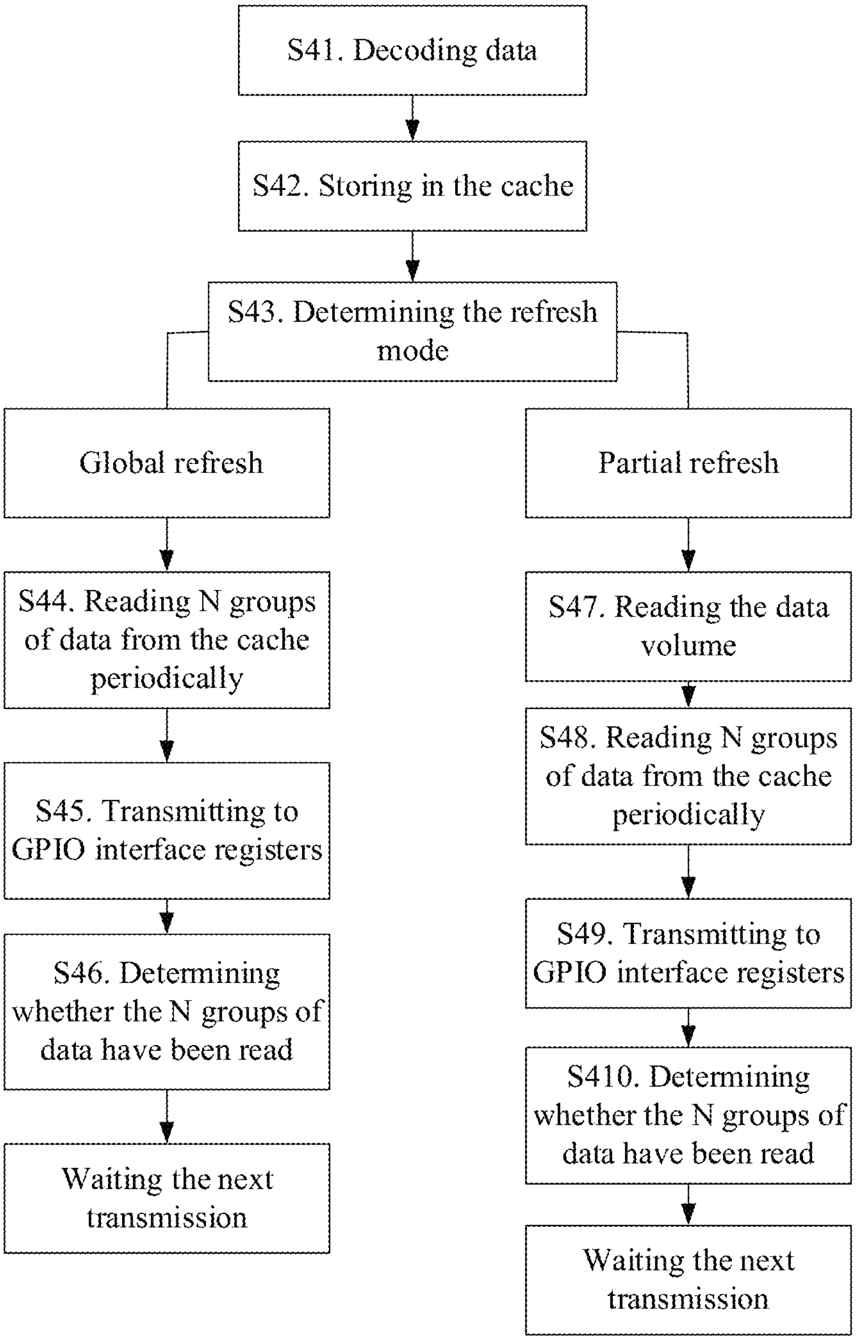
FIG. 9 is a flowchart of transmitting data from a second processor to a MIP display panel according to some embodiments of the present disclosure.

Using the resolution of 768 RGB*1024 as an example, a data size is reduced from 2360 KB to 295 KB after transcoding, as illustrated in FIG. 9.

Exemplarily, for data of an all-red image, 8 pixels before transcoding are 0b111111110b000000000b000000000b1111110b000000000b000000000b1111110b000000000b000000000b1111110b000000000b000000000b111111110b000000000b000000000b1111110b000000 000b000000000b111111110b000000000b000000000b111111110b000000000b000000000b111111 110b000000000b00000000.

8 pixels upon the transcoding are 0b100100100b01001001 0b00100100.

In some embodiments, the first processor 131 converts the first grayscale image by one thread.

In some embodiments, the MIP display panel supports three modes of operation: the global refresh, the partial refresh, and the static hold. In the case that the operation mode is the global refresh, the MIP display panel receives data of the whole image and updates the whole image. In the case that the operation mode is the partial refresh, the MIP display panel receives partial data to update the partial image, and the partial refresh is refreshed in rows. That is, a rows are refreshed each time, and a is a positive integer. The minimum data volume refreshed individually is one row of data. In the case that the operation mode is the static hold, the image does not need to be updated and the data does not need to be transmitted.

Prior to determining the operation mode, the drive mainboard needs to compare a frame of image currently displayed on the display panel with a next frame of image to be displayed, and determines the operation mode according to the number of changes in the two frames. For example, in the case that the two frames are identical, the operation mode is the static hold. In the case that all the rows of the two frames are different, the operation mode is the global refresh. In the case that only some rows of the two frames are different, the operation mode is the partial refresh.

Using the resolution of 768 RGB*1024 as an example, 1024 rows of data of an image currently displayed are first acquired, and 1024 rows of data of an image to be displayed in a next frame are compared with the 1024 rows of data of the image currently displayed row by row. A row address of a row that the data has been changed is output. In the case that the row address is not output, the operation mode is the static hold. In the case that 1024 row addresses are output, the operation mode is the global refresh. In the case that the number of output row addresses is less than 1024 and is greater than 0, the operation mode is the partial refresh.

Upon completion of the comparison, in the case that the operation mode is the partial refresh, the first processor transmits the data of the row addresses to be output in the image to be displayed in the next frame to the second processor, and the second processor then drives the MIP display panel by the N SI signals. In this way, the partial refresh function for specific rows is implemented.

In some embodiments, interfaces of the MIP display panel supporting decoding are N SI interfaces, and the composition of information of the SI is mode bits+address bits+data. The N SIs together form a row of information. Therefore, it is necessary to add the mode information and the address information at the header of the SI data, i.e., add an information header.

Figure 6:
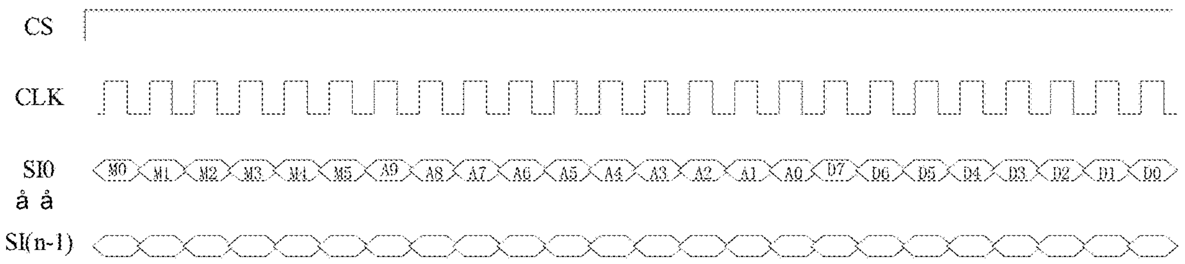
FIG. 6 is a schematic diagram of an SI signal according to some embodiments of the present disclosure.

FIG. 6 is a schematic diagram of an SI signal according to some embodiments of the present disclosure. Referring to FIG. 6, the mode information and the address information added to each of the SI signals have 16 bits, including 6 bits of the mode bits (M0 to M5) and 10 bits of the address bits (A0 to A9), followed by the data bits (D0 to D7).

Exemplarily, data of the first 24 pixels in a first row are: 0b100100100100b010010010b001001000b100100100100b010010010b001001000b10010 0100100b010010010b00100100100.

0b indicates that subsequent data is binary numbers.

Data after the adding of the information header is: 0b111111000b000000010b100100100100b1001001001 00b010010010b001001000b10010 0100b010010010 b001001000b100100100b01001001. The underlined portion is the added information header. The first 6 bits of the information header are the mode bits, i.e., 111111 (the specific mode is set as needed), and the last 10 bits of the information header are the address bits, i.e., 0000000001, which represent the first row.

Referring to FIG. 6, there are N SI signals from SI0 to SI(n−1), and the mode information and the address information are added to each of the SI signals. The N SI signals are transmitted to the MIP display panel under the control of chip select signal CS and a clock signal CLK.

In some embodiments, the first processor 131 is further configured to segment each row of data in the data of image changed portion into N pieces; and acquire N groups of data by organizing a plurality of pieces of data that are arranged in positions of the same order of the data of the image changed portion into one group, wherein the N groups of data respectively correspond to the N SL signals Organizing the plurality of pieces of data that are arranged in positions of the same order of the data of the image changed portion into one group herein indicates that splicing together the plurality of pieces of data that are arranged in positions of the same order of the data of the image changed portion successively from the smallest to the largest row number.

In some embodiments, N groups of data are generated by reordering data by the first processor, which are prepared for the subsequent output of the N SI signals of the second processor.

In addition, the reordering process is performed by the first processor (SoC), and the second processor (MCU) only needs to perform the transmission, which avoids the inefficiency caused by processing both the reordering and the transmission by the MCU.

In some embodiments, output interfaces of the second processor are N SI outputs. To improve the transmission efficiency, the first processor groups and packages the data to facilitate extraction of the data by the second processor. The second processor only needs to circularly allocate the grouped data to the N SIs. That is, the grouped and packaged N groups of data are successively allocated to the N SIs.

Using the resolution of 768*1024 and the number of SIs is 16 as an example, each row of the data is segmented into 16 pieces and the header information is added to each of the pieces. Using the global refresh as an example, first pieces of data of 1024 rows need to be combined together. That is, an SI0 signal is the combination of the first pieces of data of 1024 rows, an SI1 signal is the combination of the second pieces of data of 1024 rows, and the like.

For example, a first piece of data in a first row is:
0b111111000b000000010b100100100b100100100100
b010010010b001001000b100100100b01001 001;

A first piece of data in a second row is:
0b111111000b000000100b100100100100b1001001001
00b010010010b001001000b100100100b01 001001;

. . .

A first piece of data in a sixteenth row is:
0b111111000b000100000b100100100100b1001001001
00b010010010b001001000b100100100b01 001001.

Then the SI0 signal upon the reordering is:
0b111111000b000000010b100100100b100100100100b
010010010b001001000b100100100b01001 0010b11
11000b000000100b100100100b100100100b010010
010b001001000b100100100b0100100 1 . . . 0b1111
11000b000100000b100100100b100100100100b0100
10010b001001000b100100100b010 01001.

To facilitate the subsequent decoding by the MIP display panel, all the information headers are placed at the top when reordering. In this case, the SI0 signal is:
0b111111000b000000010b111111000b00000010 . . .
0b111111000b000100000b100100100100b10 0100
100b010010010b001001000b100100100b01001001
0b100100100b100100100b010010010b00 1001000b
100100100b01001001 . . . 0b100100100b1001001
00100b010010010b001001000b100100 100100b0
1001001.

That is, the first processor is also configured to combine the mode information and the address information of each piece of data in each group of data and arrange the combined information at the header of each group of data.

In the above embodiment, the underlined portion is the information header.

In some embodiments, the first processor 131 is further configured to transmit a data volume of the data of the image changed portion to the second processor 132.

The second processor 132 is further configured to generate a clock signal based on the data volume. The clock signal is configured to control a time sequence of the transmission of the N SL signals.

Exemplarily, the first processor 131 transmits pilot data to the second processor 132. The data volume is carried in the pilot data.

Optionally, the pilot data includes a mode and a state identifier in addition to the data volume.

The data volume is a data volume of a frame of image transmitted from the first processor 131 to the second processor 132, i.e., the number of rows of data to be refreshed. The mode refers to the refresh mode, including the static hold (no refresh), the partial refresh, or the global refresh. The state identifier indicates a transmission state of the data, and the state identifier changes with the data transmission between the first processor 131 and the second processor 132. In the case that the data transmission between the first processor 131 and the second processor 132 is completed, the state identifier transmitted from the first processor 131 to the second processor 132 is completion of the transmission.

In some embodiments, the data transmission between the first processor 131 and the second processor 132 requires a high rate. Using the resolution of 768 RGB*1024 and the refresh rate of 25 Hz as an example, the transmission rate is (768×3 bits+(16+16))×1024×25 Hz=59.8 Mbps.

In the above formula, the first 16 means that the information header is 16 bits, and the second 16 is an empty dummy bit to identify the end.

Rates of common interfaces are as follows. The IIC is 5 Mbps, the serial peripheral interface (SPI) is 50 Mbps, and the USB full speed (FS) is 12 Mbps, which are all unable to meet the requirements. Rates of other common display interfaces such as the mobile industry processor interface (MIPI), the high definition multimedia interface (HDMI), and the low-voltage differential signaling (LVDS) interface are above Gbps, which are all able to meet the requirements. However, the above interfaces are used by the directly drive display IC, and the MCU does not typically support the signal decoding of these interfaces. Therefore, as described above, the USB high-speed interface with a transmission rate of 480 Mbps is used in the present disclosure, which meets the rate requirements and also achieves the decoding of signals by the MCU.

The first processor 131 transmits the image data to the second processor 132 by the USB HS interface. The second processor 132 simulates the SI signal to carry the data by the GPIO interface, generates a corresponding CLK, and outputs the corresponding CLK to the MIP display panel. Decoding circuits of the MIP display panel are N SI decoding circuits.

The first processor 131 transmits the pilot data to the second processor prior to transmitting the image data. The second processor generates the corresponding CLK based on the data volume in the pilot data, and then transmits N groups of data with the CLK to the MIP display panel by N interfaces.

Exemplarily, the second processor determines a length of the CLK based on the data volume in the pilot data, wherein each bit of data corresponds to one high level in the CLK, and determines a frequency of the CLK according to the reception and decoding capability of the display panel. For example, the CLK frequency is typically defined to range from 4 to 6 MHz according to the capability of the MIP display panel.

In some embodiments, a plurality of SI signals share one CLK, or a separate CLK is configured for each of the SI signals, but waveforms of the plurality of CLKs are the same.

Figure 7:
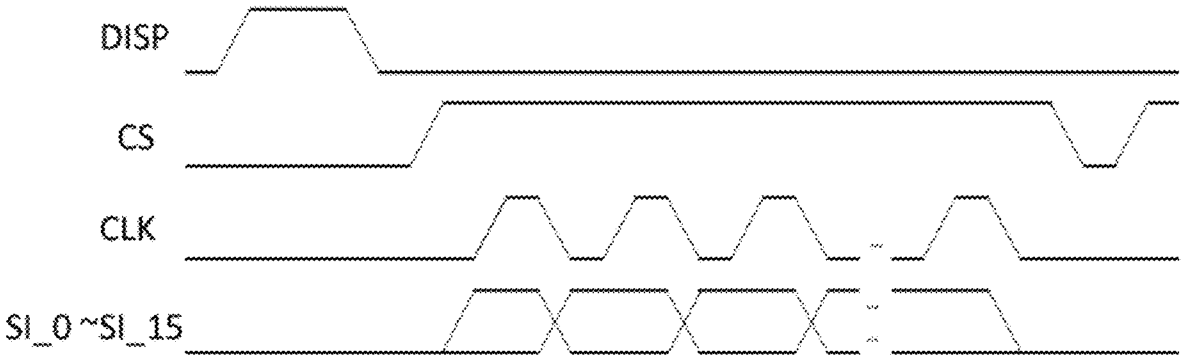
FIG. 7 is an oscillogram of an output signal of a second processor according to some embodiments of the present disclosure.

FIG. 7 is an oscillogram of an output signal of a second processor according to some embodiments of the present disclosure. Referring to FIG. 7, the waveform of the output signal of the second processor includes DISP, CS, CLK, and SI signals.

The display (DISP) is a start-up control signal of the MIP display panel, which is valid at the high level. The CS is a control signal of communication. The MIP display panel decodes the SI signal only when the CS signal is at the high level. The CLK is a clock signal of communication, of which the frequency varies according to a size of the displayed data. The SI is a data signal, including 16 signals of SI_1 to SI_15.

In the case that one CLK is shared, the second processor finally outputs a total of 19 signals. In the case that a separate CLK is configured for each of the SIG signals, the second processor finally outputs a total of 34 signals. The high level of each signal herein ranges from 3 to 5.5 V and the low level ranges from 0 to 1 V.

In some embodiments, the transmission between the first processor and the second processor is achieved in parallel with the processing of the image data, which is described hereinafter in conjunction with the accompanying drawings.

Figure 8:
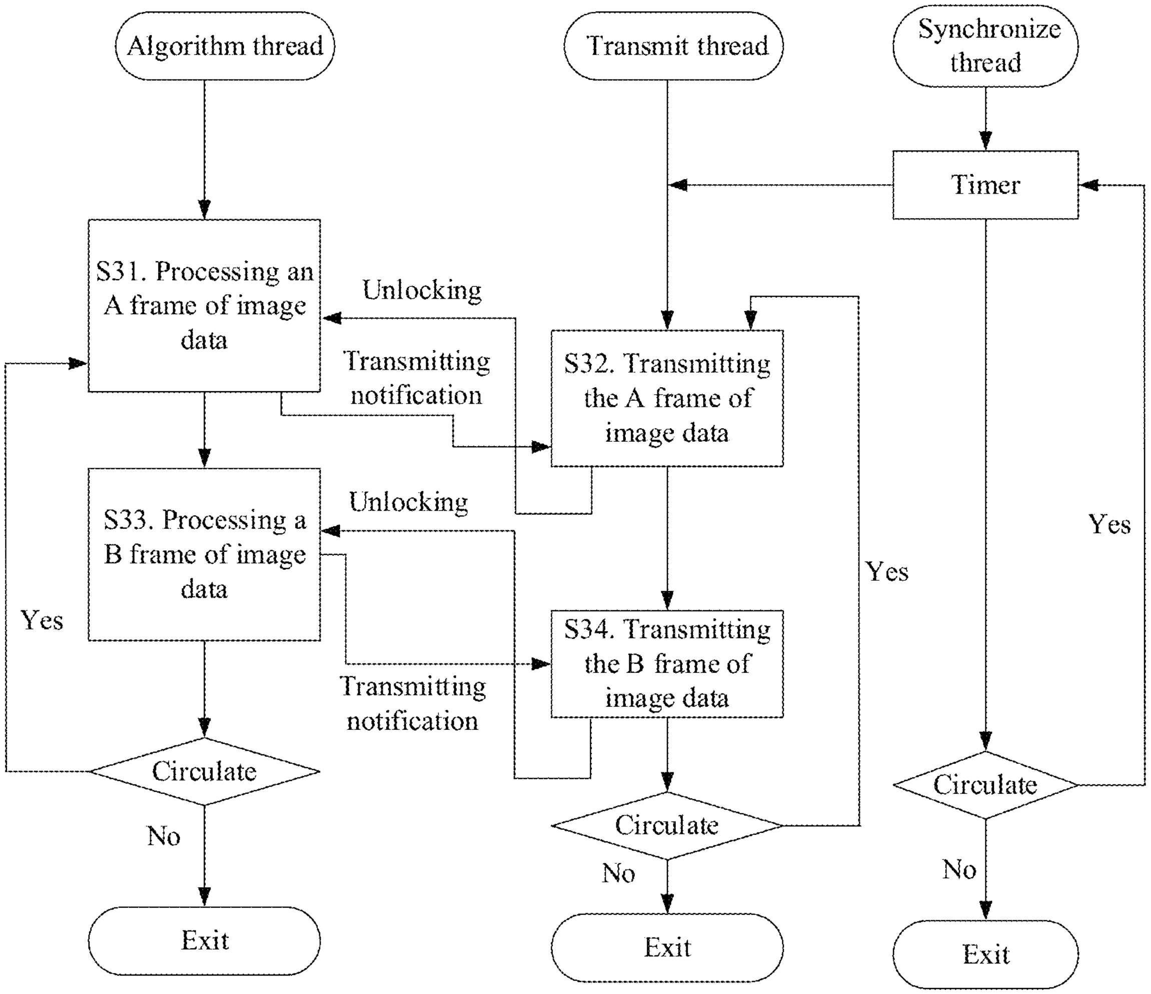
FIG. 8 is a flowchart of transmission and processing according to some embodiments of the present disclosure.

FIG. 8 is a flowchart of transmission and processing according to some embodiments of the present disclosure. Referring to FIG. 8, the first processor completes the transmission and processing of the data by an algorithm thread, a transmit thread, and a synchronize thread together.

Referring to FIG. 8, because the transmission is performed between the first processor and the second processor, the synchronization between the transmitter and receiver needs to be considered. The synchronize thread herein is triggered by a timer. When the synchronize thread is open, the transmit thread is notified to perform the transmission.

Referring to FIG. 8, the flowchart includes the following steps. In S31, the algorithm thread processes an A frame of image data and, upon completion of processing, notifies the transmit thread that transmission of the A frame is available. In S32, the transmit thread transmits the A frame of image data to the second processor upon receiving the notification and, upon completion of the transmission, informs the algorithm thread that the transmit thread is idle by an unlocking notification. In S33, the algorithm thread processes a B frame of image data upon completion of processing of the A frame of image data, and informs the transmit thread that transmission of the B frame of image data is available to be performed upon completion of the processing of the B frame of image data. In S34, the transmit thread transmits the B frame of image data to the second processor upon receiving the notification, and informs the algorithm thread that the transmit thread is idle by an unlocking notification upon completion of the transmission. The processing and transmission of the data end until the timer of the synchronize thread ends.

In this implementation, the method of double buffering and thread separation is used to optimize the flow of the transmission and processing, and thus time is saved and the latency is reduced.

FIG. 9 is a flowchart of transmitting data from a second processor to a MIP display panel according to some embodiments of the present disclosure. Referring to FIG. 9, the flowchart includes the following steps. In S41, upon receiving the pilot data, the second processor first performs USB data decoding. In S42, a corresponding Flash cache space is requested according to a size of the data volume of the pilot data, and then all of the pilot data and the reordered image data are stored in the Flash cache. In S43, in the case that the state identifier is the completion of transmission, the refresh mode in the pilot data is acquired, and the data is read from the cache based on the refresh mode and then transmitted.

In the case that the refresh mode is the global refresh, in S44, N groups of data are periodically read from the cache. For example, 1 bit of the 0th group to the N−1st group is successively read in each cycle. In S45, in each cycle, the read data is successively transmitted to GPIO interface registers corresponding to SI0 to SI15 on the MCU. Steps S44 and S45 are circularly performed and step S46 is performed after each cycle. Whether the N groups of data have been read is determined. In the case that the N groups of data have been read, the next transmission is awaited otherwise the cycle continues.

In the case that the refresh mode is the partial refresh, in S47, the data volume is read. In S48, N groups of data is periodically read from the cache. For example, 1 bit of the $0^{th}$ group to the N−1st group is successively read in each cycle. In S49, in each cycle, the read data is successively transmitted to GPIO interface registers corresponding to SI0 to SI15 on the MCU. Steps S48 and S49 are circularly performed and step S410 is performed after each cycle. Whether the N groups of data have been read is determined according to a data volume. In the case that the N groups of data have been read, the next transmission is awaited otherwise the cycle continues.

It should be worth noting that during the global refresh, the data volume is constant, and the step of reading the data volume is not executed in this case.

Based on the data volume and a preset value of N, a length of each group of data is known, and thus a position of the first bit of each group of data is known, such that each group of data is capable of being read periodically.

Whether the reading is finished is determined according to the length of each group of data and the number of cycles currently cycled. In the case that the number of cycles is the length of each group of data plus 1, it is determined that the reading has been finished.

Using the resolution of 768*1024 and 16 SIs as an example, during performing the global refresh, the length of each group of data is 768*3*1024/16, and the length of each group of data is also the number of cycles to be cycled.

During performing the partial refresh, the length of each group of data is 768*3*C/16, C is the number of rows corresponding to the data volume, and the length of each group of data is also the number of cycles to be cycled.

Figure 10:
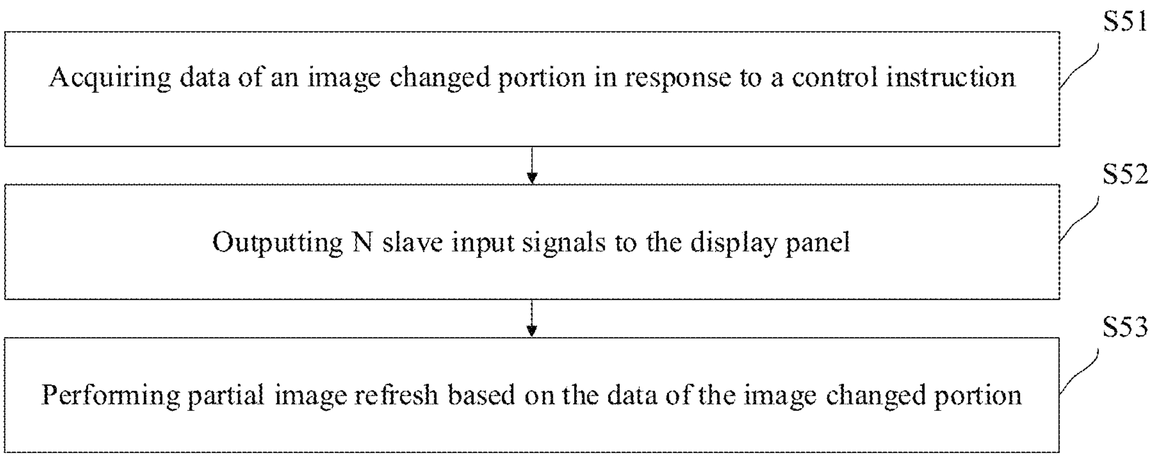
FIG. 10 is a flowchart of a display method according to some embodiments of the present disclosure.

FIG. 10 is a flowchart of a display method according to some embodiments of the present disclosure. The method is applicable to the display device illustrated in FIG. 1. The method includes the following steps.

In S51, data of an image changed portion is acquired in response to a control instruction, wherein the control instruction is issued for controlling a partial change of an image displayed on a display panel.

Step S51 is performed by a first processor of a drive mainboard.

In S52, N slave input signals are output to the display panel, wherein the N slave input signals carry the data of the image changed portion, and N is a positive integer greater than 1.

Step S52 is performed by a second processor of the drive mainboard.

In S53, partial image refresh is performed based on the data of the image changed portion.

Step S53 is performed by the display panel.

In the embodiments of the present disclosure, the drive mainboard transmits the data of the image changed portion to the display panel in the case that the control instruction is issued for controlling the partial change of the image of the display panel, and the display panel performs the partial image refresh based on the data of the image changed portion. Because the partial refresh of the display panel takes less time compared with the whole image refresh, the response time is greatly reduced and the latency is reduced. In addition, two processing units are employed. One of the two processing units is responsible for image loading and image processing, which ensures processing speed; the other achieves a serial-to-parallel conversion and transmits images to the display panel by N parallel SI signals, which ensures data transmission speed, and thus the response time is short. The N parallel outputs are implemented by the drive mainboard, such that a display IC arranged between the drive mainboard and the display panel in some practices is dispensed, and thus devices are simplified, and the size is reduced.

In some embodiments, acquiring the data of the image changed portion in response to the control instruction includes: performing image loading by a load thread, and acquiring the data of the image changed portion by performing image processing, by an algorithm thread, on an image loaded by the load thread.

In the embodiments, the image loading and the image processing are performed separately by two threads, which avoids lag that tends to occur in the case that one thread is used to perform the loading and processing, and thus the latency is further reduced.

For the process of the image loading and the image processing, reference is made to FIG. 4 and the corresponding description, which is not repeated herein.

In some embodiments, the image loading and the image processing are performed by a single thread.

In some embodiments, acquiring the data of the image changed portion in response to the control instruction includes: converting a first grayscale image loaded in response to the control instruction into a second grayscale image, wherein the grayscale number of the first grayscale image is greater than the grayscale number of the second grayscale image, and the grayscale number of the second grayscale image is adaptive to the display panel; comparing the second grayscale image with an image currently displayed on the display panel, determining whether the image displayed on the display panel is partially refreshed, and determining data corresponding to a position where the display panel needs to be refreshed in the case that the refresh mode is the partial refresh; and acquiring the data of the image changed portion by adding mode information and address information to the data corresponding to the position where the display panel needs to be refreshed.

In the embodiments, in one aspect, the first grayscale image is converted into the second grayscale image by transcoding, which is more suitable for display of the display panel; in another aspect, the data corresponding to the position that needs to be refreshed is determined by comparison, and the mode information and the address information are added, such that the display panel implements the partial refresh according to the data output by the first processor, and the touch latency is small.

Exemplarily, the grayscale number of the first grayscale image is 256 and the grayscale number of the second grayscale image is 8. By converting the image of 256 grayscales to the image of 8 grayscales that is suitable for the display panel, compared with an image of 3 grayscales displayed on an electronic paper display panel, the grayscales are richer.

In some embodiments, converting the first grayscale image loaded in response to the control instruction into the second grayscale image includes: converting the first grayscale image in parallel by calling, by an algorithm thread, a plurality of transcode threads, wherein each of the transcode threads processes a plurality of rows of data in the first grayscale image.

In the embodiments, by using the plurality of threads to process the first grayscale image in parallel, the transcoding efficiency is increased and the latency is reduced compared with using a single thread.

For the process of the image conversion, reference is made to FIG. 5 and the corresponding description, which is not repeated herein.

In some embodiments, the conversion of the first grayscale image is performed by a single thread.

In some embodiments, acquiring the data of the image changed portion in response to the control instruction includes: segmenting each row of data in the data of the image changed portion into N pieces; and acquiring N groups of data by organizing a plurality of pieces of data that are arranged in positions of the same order in the data of the image changed portion into one group, wherein the N groups of data respectively correspond to the N slave input signals.

In some embodiments, the N groups of data are generated by reordering the data, which are prepared for the subsequent output of the N SI signals.

In some embodiments, the first processor is further configured to combine the mode information and the address information of each piece of data in each group of data and arrange the combined information at a header of each group of data.

In some embodiments, transmitting the data of the image changed portion to the display panel in response to the control instruction further includes: generating a clock signal according to a data volume of the data of the image changed portion, wherein the clock signal is configured to control a time sequence of transmission of the N SI signals.

In some embodiments, the slave input signal includes the image data, the address information, and the mode information, wherein the address information indicates an address of the display panel to which the image data is to be written, and the mode information indicates that the refresh mode of the display panel is the partial refresh.

Figure 11:
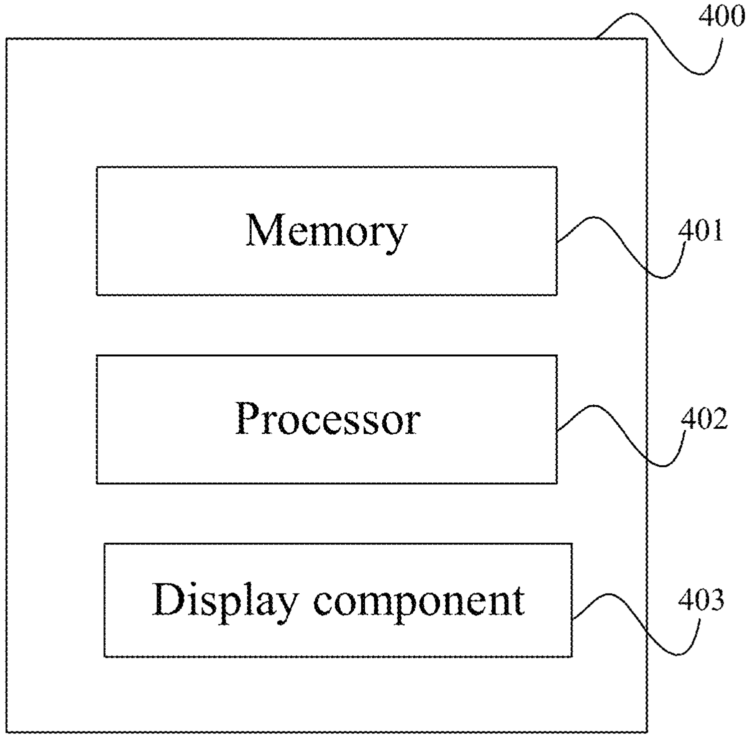
FIG. 11 is a schematic structural diagram of a terminal according to some embodiments of the present disclosure.

As illustrated in FIG. 11, some embodiments of the present disclosure further provide a terminal 400, which is a display device. The terminal 400 is configured to perform the display method according to each of the above embodiments. Referring to FIG. 11, the terminal 400 includes a memory 401, a processor 402, and a display component 403. It should be understood by those skilled in the art that the structure of the terminal 400 illustrated in FIG. 11 does not construe any limitation to the terminal 400, and in practice, the terminal included more or fewer components than illustrated, or a combination of certain components, or a different arrangement of components.

The memory 401 is configured to store one or more computer programs as well as modules, and the memory 401 primarily includes a program storage region and a data storage region. The program storage region stored an operating system and applications required for at least one function. The memory 401 includes high-speed random access memory and a non-volatile memory, such as at least one disk memory device, a flash memory device, or other volatile solid state memory devices. Accordingly, the memory 401 further includes a memory controller to provide access to the memory 401 by the processor 402.

The processor 402 performs various functional applications and data processing by running the one or more software programs and the modules stored in the memory 401.

The display component 403 is configured to display images, and the display component 403 includes a display panel. Optionally, the display panel is configured using a liquid crystal display (LCD) or an organic light-emitting diode (OLED).

Some exemplary embodiments of the present disclosure provide a computer-readable storage medium. The computer-readable storage medium is a non-volatile storage medium and stores one or more computer programs therein. The one or more computer programs stored in the computer-readable storage medium, when loaded and executed by a processer, cause the processor to perform the display method according to some embodiments of the present disclosure.

Some exemplary embodiments of the present disclosure provide a computer program product. The program product stores one or more instructions therein. The one or more instructions, when loaded and run on a computer, cause the computer to perform the display method according to some embodiments of the present disclosure.

Some exemplary embodiments of the present disclosure provide a chip. The chip includes a programmable logic circuit and/or program instructions. The chip, when running on a computer, is caused to perform the display method according to some embodiments of the present disclosure.

Those skilled in the art may understand that all or some of the steps to achieve the above embodiments can be accomplished by hardware, or by a program to instruct the relevant hardware. The program is stored in a computer-readable storage medium, and the above storage medium can be a read-only memory, a disk, or an optical disk.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A display device, comprising:

a display panel and a drive mainboard, wherein the drive mainboard comprises a first processor and a second processor, the second processor being electrically connected to the first processor and the display panel;

wherein the first processor is configured to acquire data of an image changed portion in response to a control instruction and output the data of the image changed portion to the second processor, wherein the control instruction is issued for controlling a partial change of an image displayed on the display panel;

the second processor is configured to output N slave input signals to the display panel, wherein the N slave input signals carry the data of the image changed portion, N being a positive integer greater than 1; and the display panel is configured to perform partial image refresh based on the data of the image changed portion, wherein the first processor is configured to:

convert a first grayscale image loaded in response to the control instruction into a second grayscale image, wherein a grayscale number of the first grayscale image is greater than a grayscale number of the second grayscale image, and the grayscale number of the second grayscale image is adaptive to the display panel;

determine whether the image displayed on the display panel is partially refreshed by comparing the second grayscale image with an image currently displayed on the display panel, and determine data corresponding to a position where the display panel needs to be refreshed in response to the image on the display panel is partially refreshed; and acquire the data of the image changed portion by adding mode information and address information to the data corresponding to the position where the display panel needs to be refreshed, such that the displayed image is partially refreshed based on the acquired data of the image change portion according to the added mode and address information.

2. The display device according to claim 1, wherein the first processor loads an image by a load thread, and acquires the data of the image changed portion by performing image processing, by an algorithm thread, on the image loaded by the load thread.

3. The display device according to claim 1, wherein the first processor is configured to convert the first grayscale image in parallel by calling, by an algorithm thread, a plurality of transcode threads, wherein each of the transcode threads processes a plurality of rows of data in the first grayscale image.

4. The display device according to claim 1, wherein the first processor is further configured to:

segment each row of data in the data of the image changed portion into N pieces; and acquire N groups of data by organizing a plurality of pieces of data that are arranged in positions of a same order of the data of the image changed portion into one group, wherein the N groups of data respectively correspond to the N slave input signals.

5. The display device according to claim 4, wherein the first processor is further configured to combine mode information and address information of each piece of data in each group of data and arrange the combined information at a header of the each group of data.

6. The display device according to claim 1, wherein the first processor is further configured to transmit a data volume of the data of the image changed portion to the second processor; and the second processor is further configured to generate a clock signal based on the data volume, wherein the clock signal is configured to control a time sequence of transmission of the N slave input signals.

7. The display device according to claim 1, wherein the slave input signal comprises image data, address information, and mode information, wherein the address information indicates an address of a display panel to which the image data is to be written, and the mode information indicates that a refresh mode of the display panel is partial refresh.

8. The display device according to claim 1, wherein the first processor is a system on chip, and the second processor is a micro controller unit.

9. The display device according to claim 1, wherein the first processor and the second processor are electrically connected to each other by a universal serial bus interface; and one of the first processor and the second processor is integrated with a universal serial bus physical layer chip, or one of the first processor and the second processor is externally connected to a universal serial bus physical layer chip.

10. The display device according to claim 1, wherein the display panel is a display panel having a touch function, and the control instruction is a touch instruction generated in response to a touch operation of the display panel.

11. A display method, wherein a method is applicable to a display device, the display device comprising:

a display panel and a drive mainboard, wherein the drive mainboard comprises a first processor and a second processor, the second processor being electrically connected to the first processor and the display panel; wherein the first processor is configured to acquire data of an image changed portion in response to a control instruction and output the data of the image changed portion to the second processor, wherein the control instruction is issued for controlling a partial change of an image displayed on the display panel;

the second processor is configured to output N slave input signals to the display panel, wherein the N slave input signals carry the data of the image changed portion, N being a positive integer greater than 1; and the display panel is configured to perform partial image refresh based on the data of the image changed portion; and the method comprises:

acquiring the data of the image changed portion in response to the control instruction, wherein the control instruction is issued for controlling the partial change of the image displayed on the display panel;

outputting the N slave input signals to the display panel, wherein the N slave input signals carry the data of the image changed portion, N being the positive integer greater than 1; and performing the partial image refresh based on the data of the image changed portion, wherein acquiring the data of the image changed portion in response to the control instruction comprises:

converting a first grayscale image loaded in response to the control instruction into a second grayscale image, wherein a grayscale number of the first grayscale image is greater than a grayscale number of the second grayscale image, and the grayscale number of the second grayscale image is adaptive to the display panel;

determining whether the image displayed on the display panel is partially refreshed by comparing the second grayscale image with an image currently displayed on the display panel, and determining data corresponding to a position where the display panel needs to be refreshed in response to the image displayed on the display panel is partially refreshed;

acquiring the data of the image changed portion by adding mode information and address information to the data corresponding to the position where the display panel needs to be refreshed, and displaying the partially refreshed image based on the acquired data of the image change portion according to the added mode and address information.

12. The method according to claim 11, wherein acquiring the data of the image changed portion in response to the control instruction comprises:

loading an image by a load thread, and acquiring the data of the image changed portion by performing image processing, by an algorithm thread, on the image loaded by the load thread.

13. The method according to claim 11, wherein converting the first grayscale image loaded in response to the control instruction into the second grayscale image comprises:

converting the first grayscale image in parallel by calling, by an algorithm thread, a plurality of transcode threads, wherein each of the transcode threads processes a plurality of rows of data in the first grayscale image.

14. The method according to claim 11, wherein acquiring the data of the image changed portion in response to the control instruction further comprises:

segmenting each row of data in the data of the image changed portion into N pieces; and acquiring N groups of data by organizing a plurality of pieces of data that are arranged in positions of a same order in the data of the image changed portion into one group, wherein the N groups of data respectively correspond to the N slave input signals.

15. The method according to claim 14, wherein organizing the plurality of pieces of data that are arranged in the positions of the same order in the data of the image changed portion into one group comprises:

combining mode information and address information of each piece of data in each group of data and arranging the combined information at a header of the each group of data.

16. The method according to claim 11, further comprising:

generating a clock signal based on a data volume of the data of the image changed portion, wherein the clock signal is configured to control a time sequence of transmission of the N slave input signals.

17. The method according to claim 11, wherein the slave input signal comprises image data, address information, and mode information, wherein the address information indicates an address of a display panel to which the image data is to be written, and the mode information indicates that a refresh mode of the display panel is partial refresh.

18. A terminal, comprising a processor and a memory;

wherein the memory is configured to store one or more computer programs; and the processor, when loading and running the one or more computer programs stored in the memory, is caused to perform the display method as defined in claim 11.

* * * * *